US006807210B2

(12) United States Patent
Iwai et al.

(10) Patent No.: US 6,807,210 B2
(45) Date of Patent: Oct. 19, 2004

(54) SYSTEMS AND A METHOD FOR GENERATING BLUE LASER BEAM

(75) Inventors: Makoto Iwai, Kasugai (JP); Takashi Yoshino, Ama-gun (JP); Minoru Imaeda, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 1 day.

(21) Appl. No.: 10/396,370

(22) Filed: Mar. 26, 2003

(65) Prior Publication Data

US 2003/0206565 A1 Nov. 6, 2003

(30) Foreign Application Priority Data

Apr. 2, 2002  (JP) ..................................... P2002-100130

(51) Int. Cl.[7] ............................. H01S 3/14; H01S 3/10; H01S 3/091
(52) U.S. Cl. ............................................. 372/39; 22/70
(58) Field of Search ............................. 372/39, 22, 70

(56) References Cited

U.S. PATENT DOCUMENTS

| 5,377,212 | A | * | 12/1994 | Tatsuno et al. | ................ | 372/22 |
| 5,627,849 | A | * | 5/1997 | Baer | ........................... | 372/31 |
| 5,802,086 | A | * | 9/1998 | Hargis et al. | .................. | 372/22 |
| 5,832,010 | A | * | 11/1998 | Fulbert et al. | ................. | 372/22 |
| 6,567,442 | B2 | * | 5/2003 | Urata et al. | ..................... | 372/41 |
| 6,584,134 | B2 | * | 6/2003 | Yin et al. | ...................... | 372/92 |

FOREIGN PATENT DOCUMENTS

| JP | A 3-260457 | 11/1991 |
| JP | A 5-11289 | 1/1993 |
| JP | A 5-90687 | 4/1993 |
| JP | A 5-243659 | 9/1993 |
| JP | A 5-293268 | 11/1993 |
| JP | A 6-194706 | 7/1994 |
| JP | A 9-502054 | 2/1997 |
| JP | A 10-293268 | 11/1998 |
| JP | A 2002-250949 | 9/2002 |

OTHER PUBLICATIONS

C. Czeranowsky et al., "Continuous wave diode pumped interactivity double Nd: $GdVO_4$ laser with 840 mW output power at 456 nm", Optics Communications, May 1, 2002, pp 361–365.

D. Woll et al., "I W of blue 465–nm radiation generated by frequency doubling of the output of a high–power diode laser in critically phase–matched $LiB_3O_5$", Optics Letters, May 15, 1999, vol. 24, No. 10, pp 691–693.

M. Pierrou et al., "Generation of 740 mW of blue light by intractivity of frequency doubling with a first–order quasi–phase–matched $KTiOPO_4$ crystal", Optics Letters, Feb. 15, 1999, vol. 24, No. 4, No. 4, pp 205–207.

G. Ross et al., "Generation of high–power blue light in peridically poled $LiNbO_3$", Optics Letters, Feb. 1, 1998, vol. 23, No. 3, pp 171–173.

V. Lupei et al., "Laser emission under resonant pump in the emitting level of concentrated Nd:YAG ceramics", Applied Physics Letters, Jul. 30, 2001, vol. 79, No. 5, pp 590–592.

P. Zeller et al., "Efficient, multiwatt, continuous–wave laser operation on the $F_{3/2}$–$^4$19/2 transitions of $Nd:YVO_4$ and Nd:YAG", Optics Letters, Jan. 1, 2000, vol. 25, No. 01, pp 34–36.

* cited by examiner

Primary Examiner—Don Wong
Assistant Examiner—Hung Tran Vy
(74) Attorney, Agent, or Firm—Oliff & Berridge, PLC

(57) ABSTRACT

An object of the present invention is to provide a practical device for generating blue laser beam having a wavelength of 457 nm. The present invention provides a device for generating blue laser beam. The device has a solid-state laser oscillator 3 composed of Nd-doped $YVO_4$ crystal and having a length of not smaller than 0.1 mm and not larger than 1.0 mm, a reflecting means 6A, 6B provided in the oscillator 3, an illuminating means 1 for illuminating pump light beam to the oscillator 3, and a waveguide-type device 5 for generating harmonic wave. The oscillator 3 and reflecting means 1 constitute a resonator 7. The waveguide-type device 5 is provided outside of the resonator 7. The oscillator 3 oscillates laser beam having a wavelength of 914±1 nm, and the waveguide-type device 5 oscillates blue laser "E" having a wavelength of 457±1 nm.

12 Claims, 4 Drawing Sheets

SYSTEMS AND A METHOD FOR GENERATING BLUE LASER BEAM

This application claims the benefit of Japanese Patent Application P2002-100,130, filed on Apr. 2, 2002, the entirety of which is incorporated by reference.

BACKGROUND OF THE INVENTION

1. Field of the Invention

The invention relates to a device for generating blue laser beam having a wavelength of 457 nm with a high efficiency.

2. Related Art Statement

In the field of optical information processing, it has been demanded a blue laser oscillator capable of oscillating blue laser beam having a wavelength of about 400 to 430 nm at a power of not lower than 80 mW for realizing high density optical recording. Suppliers have been competed for supplying such device in a market. As such a light source for generating blue laser beam, it has been expected an optical waveguide-type device for converting wavelength having a laser beam source oscillating red light as fundamental wave and a second order harmonic wave generator of quasi-phase matching system.

In particular, blue laser beam having a wavelength of about 457 nm has been strongly demanded for various applications including blue light source of RGB (three primary colors) system, print laboratory, projector or the like. An output of not lower than 200 mW has been demanded depending on the application.

Japanese patent publication 293,268A discloses a system for oscillating blue laser beam having a wavelength of 460 nm. In the system, Nd-YAG laser beam with a wavelength of 1064 nm is used for oscillating second harmonic wave with a wavelength of 532 nm. Infrared light of 3.3 micrometer is oscillated by means of parametric oscillation of the light with a wavelength of 1064 nm. The light of 460 nm is oscillated as sum frequency of the light of 532 nm and infrared light of 3.3 micrometer. This system needs three devices each for converting wavelength The total conversion rate is low and unpractical.

Japanese patent number 3,260,457 discloses a system for oscillating blue laser beam. In the system, excitation light having a wavelength of 809 nm is irradiated onto Nd-doped YAG crystal to oscillate laser beam having a wavelength of 946 nm. The laser beam of 946 nm is then irradiated to a second harmonic wave generator provided in an MgO—LN substrate installed in a resonator so that the wavelength of the laser beam is converted to 473 nm. 10 mW of the laser beam with a wavelength of 473 nm is obtained when an output of the laser beam of 946 nm is 200 mW so that a total efficiency of light-light conversion is 5 percent.

According to Japanese patent publication 6-194,706A, a semiconductor laser device outputs laser beam having a wavelength of 880 nm. The laser beam is irradiated onto a second harmonic wave generator of proton exchange optical waveguide type formed in an MgO—LN substrate to obtain laser beam of a wavelength of 440 nm. A power of 12 mW is attained when the power of the semiconductor laser is 100 mW.

In Japanese patent publications 5-11289A and 5-90687A, it is briefly described that a laser device may be fabricated using $Nd:YVO_4$ and $KNbO_3$ for oscillating laser having a wavelength of 457 nm. No experimental evidence is presented.

Similar description is found in Japanese patent publication 5-248659A. Moreover, it is briefly described that sum frequency of semiconductor laser beam having a wavelength of 809 nm and $Nd:YVO_4$ laser beam having a wavelength of 1064 nm is generated using KTP crystal. No numerical description is found.

Japanese patent publication 9-502054A disclosed laser device generating laser having a wavelength of 457 nm or 456 nm. This device utilizes $Nd:YVO_4$ or $Nd:GdVO_4$ crystal and $KNbO_3$ or BBO crystal for generating second harmonic wave. This device is a kind of internal resonator type having a wavelength converting device installed in a resonator for laser oscillation, and its structure is thus substantially different from that of the present invention. The output and efficiency are not described.

As described above, it has not been presented an example successfully oscillating blue laser beam having a wavelength of about 457 nm at a high efficiency and power.

Laser oscillation based on $^4F_{3/2}$–$^4I_{9/2}$ transition of Nd doped $YVO_4$ crystal is described in (OPTICS LETTERS) Vol. 25, No. 01, (2000) January, pages 34 to 36. That is, excitation light having a wavelength of 808 nm is irradiated onto Nd-doped $YVO_4$ crystal to oscillate laser beam having a wavelength of about 914 nm.

SUMMARY OF THE INVENTION

The inventors have studied to utilize such laser beam having a wavelength of about 914 nm to oscillate second harmonic wave, that is, blue light having a wavelength of 457 nm. The threshold for oscillation of laser beam having a wavelength of 914 nm is as high as about 3.5 W according to the publication. The slope efficiency is low and heat generation is considerable. It is thus difficult to obtain a device for oscillating blue light beam with a low driving voltage due to the high threshold of laser oscillation. It is also difficult to obtain a practical device for oscillating blue light due to the low slope efficiency and generation of a large heat.

An object of the present invention is to provide a practical device for oscillating blue laser beam having a wavelength of about 457 nm.

The present invention provides a device for oscillating blue laser beam having a solid laser oscillator composed of Nd-doped $YVO_4$ crystal and having a length of not smaller than 0.1 mm and not larger than 1.0 mm, a reflecting means provided in the solid laser oscillator, an illuminating means for illuminating excitation light beam to the solid laser oscillator, and a waveguide-type device for generating harmonic wave. The solid laser oscillator and reflecting means constitute a resonator. The waveguide-type device is provided outside of the resonator. The solid laser oscillator oscillates laser beam having a wavelength of 914±1 nm and the waveguide-type device oscillates blue laser having a wavelength of 457±1 nm.

The present invention further provides a method of oscillating blue laser beam, using a solid laser oscillator composed of Nd-doped $YVO_4$ crystal and having a length of not smaller than 0.1 mm and not larger than 1.0 mm, a reflecting means provided in the solid laser oscillator, and a waveguide-type device for generating harmonic wave. The solid laser oscillator and the reflecting means constitute a resonator. The waveguide-type device is provided outside of the resonator. The excitation light beam is irradiated to the solid laser oscillator so that the oscillator oscillates laser beam having a wavelength of 914±1 nm and the waveguide type device oscillates blue laser having a wavelength of 457±1 nm.

The inventors have successfully provided a device for oscillating blue laser beam having a wavelength of 457±1 nm by means of the structure described above and thus successfully provided a practical device for oscillating blue laser beam.

The blue laser beam having a wavelength of 457 nm is suitable for a blue light source for use in RGB (three primary colors) system. A blue light source having a low oscillation threshold and heat generation has been strongly demanded. The present invention provides a substantial progress in this field.

The present invention will be further described below. FIG. 1 is a view schematically showing major states in Nd-doped $YVO_4$ crystal. When excitation light beam of 808 nm is irradiated onto and absorbed into Nd-doped $YVO_4$ crystal, electrons in the crystal are excited from ground state to $^4F_{5/2}$ state. After the excited electrons are then relaxed from $^4F_{5/2}$ state shown as "P", transition of the electrons occur from $^4F_{3/2}$ state to $^4I_{11/2}$ or $^4I_{9/2}$ state. Photons are generated during the transition. Light having a wavelength of 914 nm is oscillated based on the transition of $^4F_{3/2}$ to $^4I_{9/2}$ states, and light having a wavelength of 1064 am is oscillated based on the transition from $^4F_{3/2}$ to $^4I_{11/2}$ states.

According to [OPTICS LETTERS] Vol. 25, No. 01, (2000) January, pages 34 to 36, excitation light with a wavelength of 808 nm is irradiated onto Nd-doped $YVO_4$ crystal to oscillate light with a wavelength of 914 nm.

The inventors have tried to illuminate excitation light with a wavelength of 880±2 nm onto a laser oscillator composed of Nd-doped $YVO_4$ crystal to excite electrons directly to $^4F_{3/2}$ state. The subsequent transition of the excited electrons to $^4I_{9/2}$ state results in oscillation of light with a wavelength of 914 nm. It is thus possible to reduce a threshold value of the oscillation of light with a wavelength of 914 nm and to improve the slope efficiency.

According to [APPLIED PHYSICS LETTERS] Vol. 79, No. 5, (2001) July, pages 590 to 592, light with a wavelength of 885 nm is irradiated onto Nd-doped YAG ceramics to excite electrons. The transition of the excited electrons from $^4F_{3/2}$ state to $^4I_{11/2}$ state results in oscillation of laser beam with a wavelength of 1064 nm. It is not, however, described oscillation of laser beam resulting from the transition of electrons from $^4F_{3/2}$ state to $^4I_{9/2}$ state.

The effects, features and advantages of the invention will be appreciated upon reading the following description of the invention when taken in conjunction with the attached drawings, with the understanding that some modifications, variations and changes of the same could be made by the skilled person in the art.

PREFERRED EMBODIMENTS OF THE INVENTION

Figure 1:
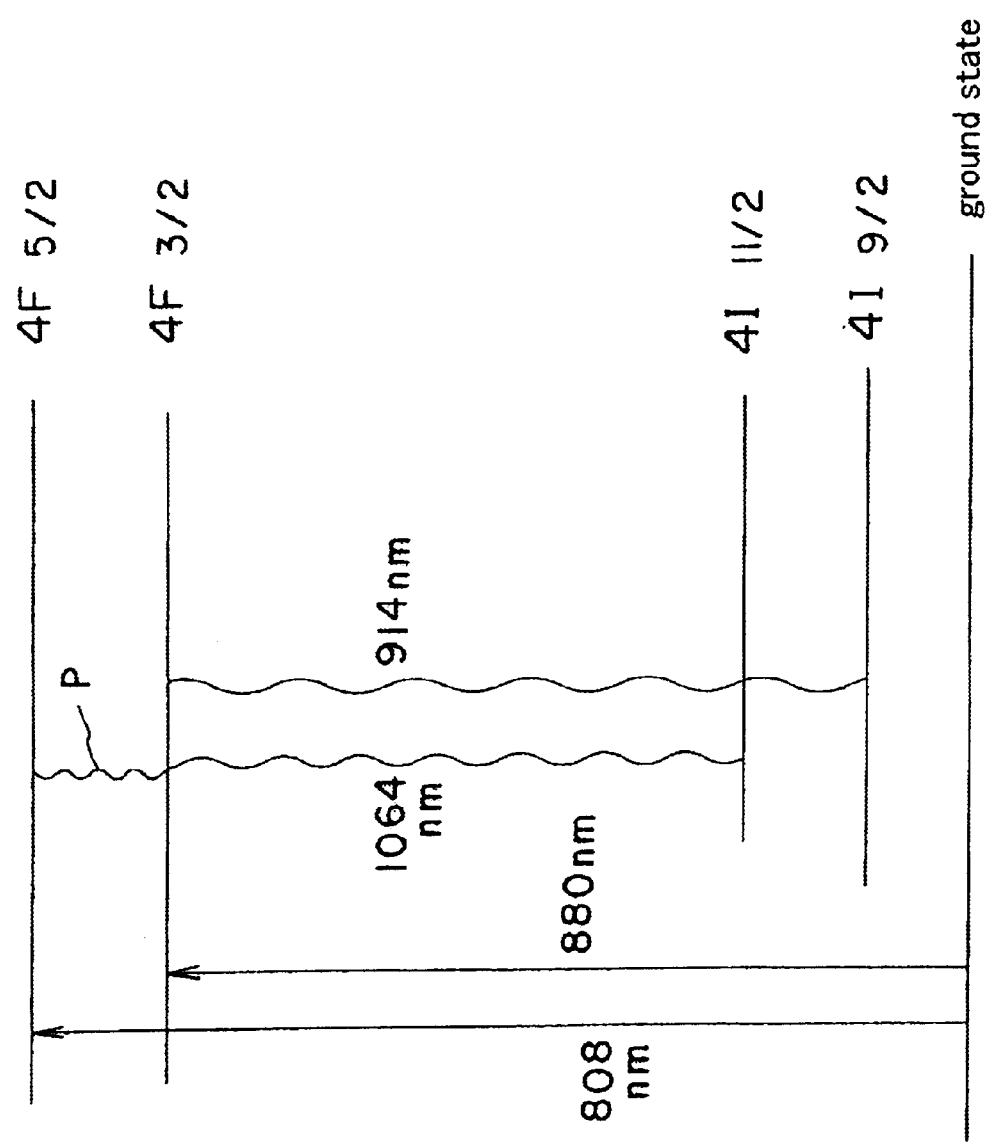
FIG. 1 is a diagram schematically showing representative energy states relating to laser oscillation in Nd-doped $YVO_4$ crystal.

Nd-doped $YVO_4$ crystal may be produced by means of any methods including temperature gradient method, flux method, epitaxial thin film deposition and ceramic production technique in the present invention.

The shape of Nd-doped $YVO_4$ crystal is not particularly limited to a plane parallel plate and includes plates each of flat-concave, flat-convex, concave-flat, convex-flat, concave-concave, concave-convex, convex-concave or convex-convex type.

The means of irradiating light is not particularly limited, as long as excitation light with a wavelength of 880±2 nm is efficiently oscillated matching with the absorption band of the Nd-doped $YVO_4$ crystal. On this viewpoint, it is preferred a semiconductor laser using GaAs semiconductor of vertical single mode.

A laser oscillator oscillates laser beam having a wavelength of 914 nm. A small deviation such as of ±1 nm is allowed depending on the state of oscillation.

A length of the laser oscillator in a direction parallel with the excitation light may preferably be not smaller than 0.1 mm and not larger than 1.0 mm, for improving the oscillation efficiency. On this viewpoint, the length may preferably be not smaller than 0.2 mm and more preferably be not larger than 0.5 mm.

The content of doped Nd in the Nd-doped $YVO_4$ is not particularly limited and may be, for example, 1.0 to 2.5 at. %. The content may preferably be not lower than 1 at. % for further improving the efficiency of laser oscillation. The content may preferably be not higher than 1.5 at. % for improving the crystallinity and reducing internal loss with respect to light having a wavelength of 914 nm.

In a preferred embodiment, the waveguide-type harmonic wave generator is a wavelength converting device having a ridge type optical waveguide protruding from a joining layer or substrate. Such device may be combined with the laser light source described above to reduce the driving voltage and calorific value.

Japanese patent application 2000-77630 discloses a wavelength converting device of ridge waveguide-type using Mg-doped lithium niobate crystal. In the experimental section, fundamental wave of 100 mW is used to obtain laser beam of 425 nm and 50 mW. The conversion rate is 50 percent. When the input power is increased to 500 mW, however, the oscillated laser beam is absorbed in the crystal to result in the deviation of output power and reduction of conversion rate. For example, when the input power is increased to 500 mW, the output energy is 100 mW and the conversion rate is reduced to about 20 percent.

According to the present invention as described in the example section, the period of a periodically poled structure is adjusted at 4.2 micrometer and thickness of the ridge waveguide is adjusted at 3.5 micrometer, for oscillating light of 457 mn. The conversion rate is as high as 50 percent at an input energy of 500 mW, that is, blue laser beam of 250 mW is obtained Although the reasons are not clear, it may be considered that an increase of overlapping of modes of incident light and harmonic wave as well as balance of escape of heat due to the change of waveguide size may contribute.

Further, the ambient temperature around the device according to the present invention was changed in a wide temperature range including maximum and minimum temperatures several tens ° C. higher and lower than room temperature, respectively. The outputs were measured in the wide temperature range. The reduction of output due to the temperature change was not observed so that the system may be used in a wide temperature range. Further, a thin microchip of Nd-$YVO_4$ crystal having a thickness of not larger than 1 mm was used. It is thus possible to continuously change the oscillation wavelength without causing mode hopping by adjusting the temperature of the crystal.

Figure 2:
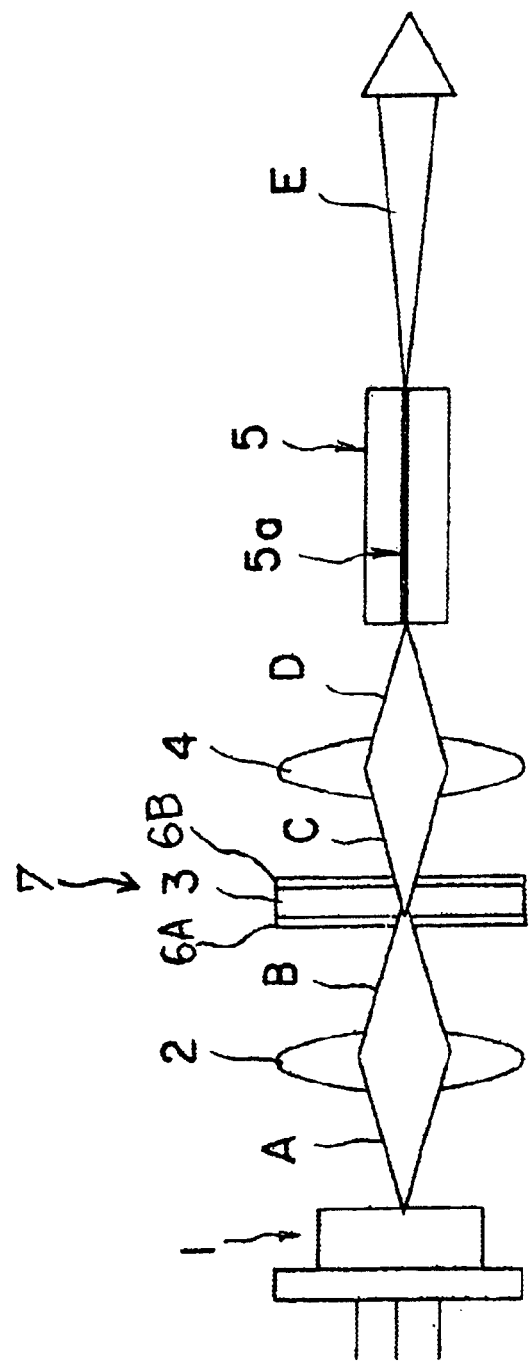
FIG. 2 is a diagram schematically showing a device for oscillating blue laser beam according to an example of the present invention.
Figure 3:
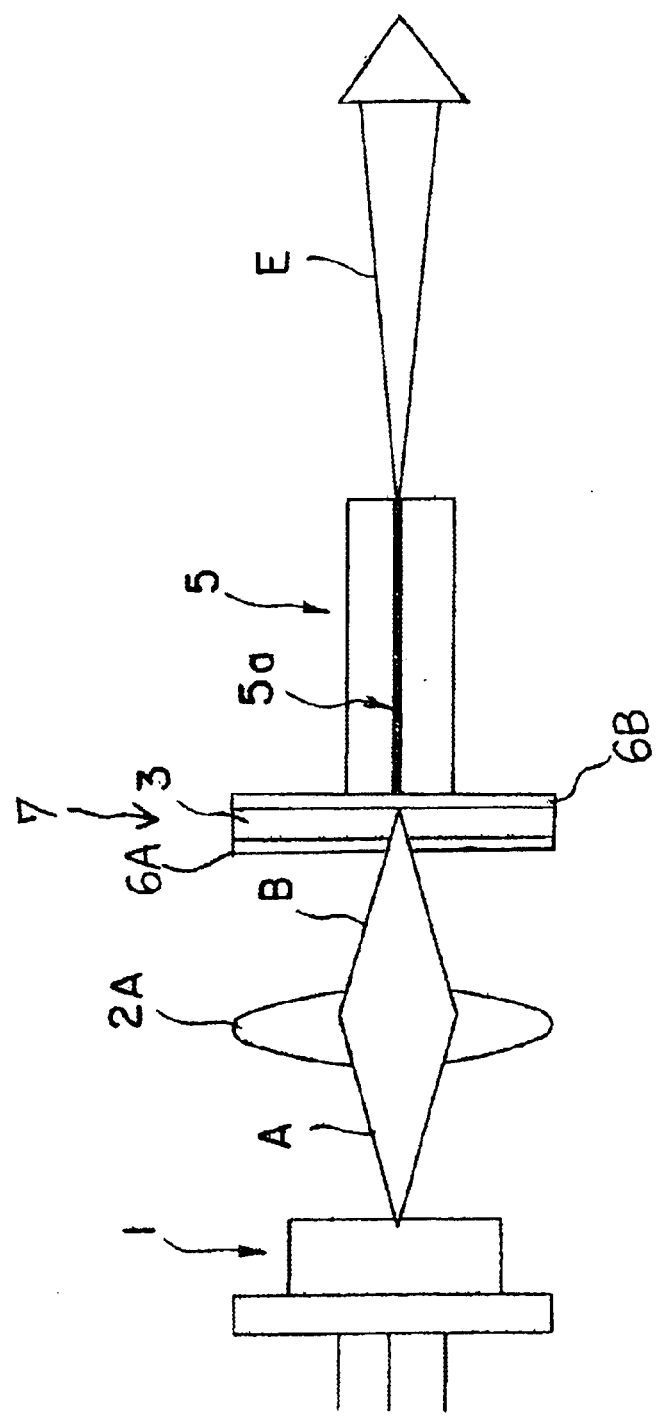
FIG. 3 is a diagram schematically showing a device for oscillating blue laser beam according to another example of the present invention.

FIGS. 2 and 3 are diagrams schematically showing devices for oscillating laser beam according to the present invention. In the device of FIG. 2, an excitation source 1 oscillates excitation light "A", which is then condensed through an optical system 2 as an arrow "B". The excitation light "A" is irradiated onto a laser oscillator 3. Reflecting means 6A and 6B are provided on the both sides of the laser oscillator 3 to constitute a resonator 7. As a result, light "C" having a wavelength of 914 nm is oscillated from the laser oscillator 3. The laser beam "C" is condensed by means of an optical system 4 and then irradiated onto a wavelength converting portion 5a of a harmonic wave generating device 5. The wavelength converting portion is composed of a three-dimensional optical waveguide, in which a periodic poled structure is formed. Blue laser beam "E" is irradiated from the wavelength converting portion 5a.

In the device of FIG. 3, the light source 1 oscillates excitation light "A", which is then condensed through an optical system 2A as an arrow "B". The excitation light is then irradiated onto the laser oscillator 3. In the present example, the resonator 7 and wavelength converting device 5 are integrated. Light having a wavelength of 914 nm is oscillated from the resonator 7 and then directly irradiated onto the wavelength converting portion 5a of the wavelength converting device 5. Blue laser beam "E" is outgone from the wavelength converting portion 5a.

According to the present invention, as shown in FIGS. 2 and 3, the harmonic wave generating device 5 is provided outside of the resonator 7. That is, when the laser oscillator is used and the harmonic wave generating device is provided inside of the resonator 7, the laser oscillation efficiency is considerably reduced. It is therefore necessary to provide a harmonic wave generator outside of the resonator. When the harmonic wave generator is provided outside of the resonator, however, the wavelength conversion rate generally tends to be lower. It is, however, possible to maintain a high conversion rate of wavelength by applying a harmonic wave generator of optical waveguide type, according to the present invention.

The reflecting means provided in a solid-state laser oscillator may preferably be a dielectric multilayer coating.

In a preferred embodiment, the three-dimensional optical waveguide is of ridge type. Such ridge type waveguide may be produced by processing a non-linear optical crystal for example, by physically processing the crystal by means of laser processing or machining and shaping. The three-dimensional optical waveguide is joined with a substrate through a joining layer composed of an amorphous material.

The optical waveguide may preferably be made of a ferroelectric single crystal and may more preferably be a single crystal selected from the group consisting of lithium niobate ($LiNbO_3$), lithium tantalate ($LiTaO_3$), a solid solution of lithium niobate-lithium tantalate, and potassium lithium niobate ($K_3Li_2Nb_5O_{15}$). A dopant of one or more metal element selected from the group consisting of magnesium (Mg), zinc (Zn), scandium (Sc) and indium (In). Magnesium is most preferred among the dopants.

The refractive index of the material of the joining layer is necessarily made lower than that of the optical waveguide. The difference of the refractive indices may preferably be not lower than 5 percent and more preferably be not lower than 10 percent. Further, the amorphous material constituting the joining layer may preferably be an organic resin or glass preferably a glass with a low melting point). The organic resin includes an acrylic resin, epoxy resin, silicone resin or the like. The glass may preferably be a glass with a low melting point mainly consisting of silicon oxide.

EXAMPLES (Oscillation of Laser Beam with a Wavelength of 914 nm)

Nd-doped $YVO_4$ single crystal (an added amount of 1 at. % of Nd) was subjected to optical polishment to obtain a plane parallel plate having a thickness of 0.5 mm. A dielectric multilayer coating 6A was provided on the surface for pump light. The multilayer coating 6A had a reflectivity of not higher than 0.5 percent to light with a wavelength of 879 to 880 nm, and a reflectivity of not lower than 99.9 percent to light with a wavelength of 914 nm. The coating 6A was not reflective to light having each of wavelengths of 1064 and 1340 nm. A dielectric multilayer coating 6B was provided on the surface for outgoing of light of the plate. The coating 6B had a reflectivity of 98 percent to light having a wavelength of 914 nm and transmittance of not lower than 80 percent to light with each of wavelengths of 879 to 880 nm, 1064 nm and 1340 nm. Semiconductor laser beam having a power of 1 W and wavelength of 880 nm was then condensed using a lens having a NA value of 0.6. The thus obtained excitation light was then irradiated onto the surface of the plate composed of a single crystal. As a result, more than 90 percent of power of light was absorbed to oscillate laser beam having a wavelength of 914 nm in single modes with respect to vertical and horizontal modes. An output power of about 500 mW was obtained.

Similarly, as shown in table 1, the output of the incident light was variously changed to oscillate light having a wavelength of 914 nm. The power of the outgoing light was measured. The results were shown in table 1 and FIG. 4.

TABLE 1

| Pump Power (mW) | Power of light having a wavelength of 914 nm | Power of light having a wavelength of 457 nm |
|---|---|---|
| 0 | 0 | 0 |
| 100 | 0 | 0 |
| 200 | 1 | 0 |
| 300 | 60 | 13 |
| 400 | 130 | 36 |
| 500 | 190 | 60 |
| 600 | 250 | 85 |
| 700 | 310 | 120 |
| 800 | 380 | 160 |
| 900 | 440 | 205 |
| 1000 | 500 | 250 |

Figure 4:
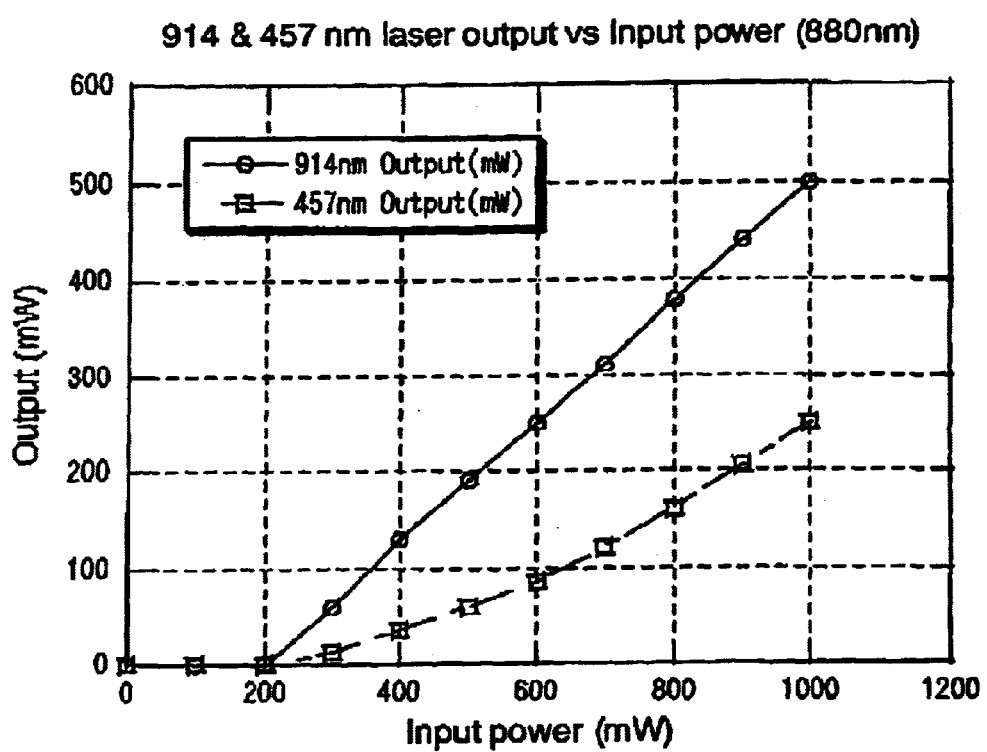
FIG. 4 is a graph showing relationship between the output of excitation light and outputs of outgoing light beams having wavelengths of 914 nm and 457 nm, respectively.

According to the device of the present invention, as shown in table 1 and FIG. 4, the threshold value of laser oscillation was as extremely low as about 200 mW. Moreover, when the output of the pump laser beam was increased, the output of the oscillated light beam having a wavelength of 914 nm was increased substantially proportionally with an increase of the output of the pump light beam. The slope efficiency was as high as about 63 percent.

(Oscillation of Blue Laser Beam)

A device for oscillating blue laser beam as shown in FIG. 2 was fabricated. The laser oscillator 3 made of Nd-doped $YVO_4$ crystal, optical system 2 and semiconductor laser 1 were the same as those described above.

Further, the device 5 for generating harmonic wave was fabricated as described below.

A substrate (thickness of 0.5 mm) composed of lithium niobate doped with 5 mole percent of MgO and having 3 degree off-cut X-face (87° Z cut) was prepared. Periodic poled structure having a period of 4.2 μm and a poled depth of 2.5 to 3.5 μm in was produced in the substrate by means of voltage application process. The substrate was then joined with a plate of X-cut and made of lithium niobate (with a thickness of 1 mm) by a glass having a low melting point mainly consisting of silicon oxide, at a temperature of about 500° C. The thickness of the joining layer was about 0.5 μm.

The substrate made of lithium niobate was then subjected to polishing by means of a polishing machine to adjust the thickness at 3.5 μm. A three-dimensional optical waveguide of ridge type was formed using a dicing machine, so that the periodic poled structure was produced in the optical waveguide.

A dielectric multilayer coating having a reflectivity of not higher than 0.5 percent to laser beam having a wavelength of 914 nm and a reflectivity of not lower than 99 percent to laser beam having a wavelength of 457 nm was provided on the surface for incidence of light of the device 5. A dielectric multilayer coating having a reflectivity of not higher than 0.5 percent to light having a wavelength of 457 nm was provided on the surface for outgoing of light of the device 5.

Laser beam with a wavelength of 914 nm oscillated from the laser oscillator 3 was collimated with the second harmonic wave generator 5 of quasi phase matching system by lens connection. Laser beam "E" of a wavelength of 457 nm had been successfully generated. The power of the pump light beam (wavelength of 880 nm) was changed as shown in table 1 and FIG. 4. The thus obtained blue laser beam of a wavelength of 457 nm was measured and shown in table 1 and FIG. 4. As can be seen from the results, the threshold value of oscillation of blue laser beam was as low as about 200 mW and the slope efficiency was proved to be excellent. When the power of the excitation light was 1 W, laser beam of a wavelength of 457 nm was obtained at a power of 250 mW. The total efficiency of light-light conversion was as high as 25 percent and practical.

As described above, the present invention provides a practical device for oscillating blue laser beam having a wavelength of 457±1 nm with a low driving voltage and reduced heat generation.

The present invention has been explained referring to the preferred embodiments. The invention is, however, not limited to the illustrated embodiments which are given by way of examples only, and may be carried out in various modes without departing from the scope of the invention.

What is claimed is:

1. A device for generating blue laser beam comprising a solid-state laser oscillator composed of Nd-doped $YVO_4$ crystal and having a length of not smaller than 0.1 mm and not larger than 1.0 mm, a reflecting means provided in said solid-state laser oscillator, an illuminating means for illuminating pump light beam to said solid-state laser oscillator, and a waveguide-type device for generating harmonic wave,
    wherein said solid-state laser oscillator and said reflecting means constitute a resonator, said waveguide-type device is positioned outside of said resonator, said solid-state laser oscillator oscillates laser beam having a wavelength of 914±1 nm and said waveguide-type device generates blue laser beam having a wavelength of 457±1 nm.

2. The device of claim 1, wherein said waveguide type device comprises a wavelength converting portion composed of a ridge-type optical waveguide.

3. The device of claim 1, wherein said pump light beam has a wavelength of 880±2 nm.

4. The device of claim 1, wherein said waveguide type device has a wavelength converting portion made of lithium niobate single crystal doped with magnesium oxide.

5. The device of claim 1, wherein said waveguide type device has a wavelength converting portion made of lithium potassium niobate single crystal.

6. The device of claim 1, wherein said Nd-doped $YVO_4$ single crystal contains Nd in an amount of 1 to 1.5 atomic percent.

7. A method of generating blue laser beam, using a solid-state laser oscillator composed of Nd-doped $YVO_4$ crystal and having a length of not smaller than 0.1 mm and not larger than 1.0 mm, a reflecting means provided in said solid laser oscillator, and a waveguide-type device for generating harmonic wave,
    wherein said solid-state laser oscillator and said reflecting means constitute a resonator, said waveguide-type device is positioned outside of said resonator, pump light beam is irradiated to said solid-state laser oscillator so that said oscillator oscillates laser beam having a wavelength of 914±1 nm and said waveguide-type device generates blue laser beam having a wavelength of 457±1 nm.

8. The method of claim 7, wherein said waveguide-type device comprises a wavelength converting portion composed of a ridge-type optical waveguide.

9. The method of claim 7, wherein said pump light beam has a wavelength of 880±2 nm.

10. The method of claim 7, wherein said waveguide-type device has a wavelength converting portion made of lithium niobate single crystal.

11. The method of claim 7, wherein said waveguide-type device has a wavelength converting portion made of lithium potassium niobate single crystal.

12. The method of claim 7, wherein said Nd-doped $YVO_4$ single crystal contains Nd in an amount of 1 to 1.5 atomic percent.

* * * * *